United States Patent [19]

Hattori

[11] Patent Number: 5,007,021

[45] Date of Patent: Apr. 9, 1991

[54] MAGNETO-OPTICAL DATA READING APPARATUS

[75] Inventor: Yutaka Hattori, Nagoya, Japan

[73] Assignee: Brother Kogyo Kabushiki Kaisha, Nagoya, Japan

[21] Appl. No.: 816,999

[22] Filed: Jan. 9, 1986

Related U.S. Application Data

[63] Continuation-in-part of Ser. No. 637,796, Aug. 6, 1984, abandoned.

[30] Foreign Application Priority Data

| Aug. 6, 1983 | [JP] | Japan | 58-144027 |
| Aug. 6, 1983 | [JP] | Japan | 58-144028 |
| Aug. 6, 1983 | [JP] | Japan | 58-144029 |
| Aug. 6, 1983 | [JP] | Japan | 58-144030 |
| Aug. 6, 1983 | [JP] | Japan | 58-144031 |

[51] Int. Cl.$^5$ .............................. G11C 13/06
[52] U.S. Cl. .............................. 365/122
[58] Field of Search .............................. 365/122, 121

[56] References Cited

U.S. PATENT DOCUMENTS

| 4,027,330 | 5/1977 | Maslowski et al. | 358/128 |
| 4,399,529 | 8/1983 | Leterme et al. | 369/110 |
| 4,410,277 | 10/1983 | Yamamoto et al. | 365/122 |
| 4,414,650 | 11/1983 | Ohta et al. | 365/122 |
| 4,424,580 | 1/1984 | Becker et al. | 365/122 |

FOREIGN PATENT DOCUMENTS

| 111988 | 4/1983 | European Pat. Off. |
| 54-76108 | 6/1979 | Japan. |
| 56-44129 A | 4/1981 | Japan. |
| 56-61054 A | 5/1981 | Japan. |
| 56-137538 A | 10/1981 | Japan. |
| 56-156943 A | 12/1981 | Japan. |
| 57-50329 A | 3/1982 | Japan. |
| 57-200961 A | 12/1982 | Japan. |
| 58-60441 A | 4/1983 | Japan. |
| 58-150150 A | 9/1983 | Japan. |
| 59-168955 A | 9/1984 | Japan. |

OTHER PUBLICATIONS

"8032 Electronics International", vol. 55, (1982) July, No. 15, New York, USA.
"Journal of Electronic Engineering", vol. 18, Feb. 1981, No. 170, Tokyo, Japan.

Primary Examiner—James W. Moffitt
Attorney, Agent, or Firm—Browdy and Neimark

[57] ABSTRACT

An apparatus for reading out information written on a magneto-optical data storage medium through magnetization thereof in one of opposite directions normal to a surface of the medium, comprising a device for emitting circularly or linearly polarized light to the storage medium in a direction parallel to the direction of magnetization of the storage medium, and a device for readng out the information based on a change in total quantity of the polarized light which is reflected from the storage medium or transmitted through the medium. The apparatus may comprise at least one polarizing beam splitter and a quarter-wave retardation plate. The device for reading out the information may comprise at least one data-reading optical detector which generates a signal corresponding to the detected total quantity of the light reflected from the storage medium. The apparatus may further comprise a monitoring device for maintaining a constant output of a light source for emitting the light, or eliminating noises caused by a variation in output of the light source.

5 Claims, 6 Drawing Sheets

MAGNETO-OPTICAL DATA READING APPARATUS

This application is a continuation-in-part of Ser. No. 637,796, filed Aug. 6, 1984, now abandoned.

BACKGROUND OF THE INVENTION

1. Field of the Art

The present invention relates to an apparatus for reading out or retrieving information from a magneto-optical storage medium.

2. Description of the Prior Art

There is known an apparatus for reading out, retrieving or reproducing, through a magneto-optical effect, information which has been written on a storage medium of a magneto-optical material having a self-magnetizing property and a comparatively high transmittance (transmission factor) of light, the information being written in individual memory locations of the storage medium through local magnetizations thereof in one of opposite directions normal to the surface of the medium. Generally, such an apparatus reads out the stored information from the magneto-optical storage material, by utilizing the Kerr effect or Faraday effect, wherein when linearly or plane polarized light is incident upon the magneto-optical material with the incident path parallel to the direction of magnetization of the material, the plane of wave vibrations (polarization) of the light reflected from or transmitted through the magneto-optical material are rotated in relation to the direction in which a given memory location is magnetized for data recording.

In the known apparatus, however, a half mirror or semi-transparent mirror is commonly used to separate the incident light and the reflected light, and the use of such a half mirror causes a loss of light, which is a drawback of the traditional apparatus. Further, the known apparatus requires an analyzer or analyzers (analyzing device) for detecting the linearly polarized light whose plane of vibrations is rotated by the Kerr or Faraday effect. Since the angle of rotation of the plane of vibrations of the linearly polarized light due to the Kerr or Faraday effect is extremely small (0.3 to 0.5 degree approximately), the apparatus requires a differential detecting device or the like for exact detection of such a minute variation in the linearly polarized light transmitted through the analyzer The requirements for such analyzer(s) and differential detecting device make the apparatus complicated in structure and consequently lead to increased cost of manufacture.

In the art of such a magneto-optical data reading or retrieving apparatus, a laser or monochroic light source is commonly used. These light sources are subject to variation in output (quantity of light produced), and the output variation is inevitably introduced as noises into a detected angle of rotation of the plane of vibrations, or detected quantity, of the light reflected from or transmitted through a magneto-optical storage medium Further, a difference in the above rotating angle or quantity of the light due to change in the magnetizing direction of the magneto-optical material is relatively very small. Therefore, the signal obtained in the traditional apparatus to read out the written information from the magneto-optical material does not yield a satisfactory high S/N ratio for accurate reading of the stored information.

SUMMARY OF THE INVENTION

It is accordingly an object of the present invention to provide a less complicated and less costly apparatus for reading out information from a magneto-optical data storage medium.

Another object of the invention is to provide such an apparatus that suffers minimum loss of light during its travel in the apparatus.

A further object of the invention is the provision of such an apparatus that is not affected by a variation in output of a light source.

A still further object of the invention is the provision of such an apparatus that produces an output signal with a high S/N ratio.

According to the invention, there is provided an apparatus for reading out information which is written on a data storage medium through magnetization thereof in one of opposite directions normal to a surface of the medium, the data storage medium including a magneto-optical layer made of a magneto-optical material, said apparatus comprising means for emitting circularly polarized light to the storage medium in a direction parallel to the direction of the magnetization of the storage medium, and means for reading out the information based on a change in total quantity of the circularly polarized light which is reflected from the storage medium or transmitted through the storage medium.

In the apparatus constructed as described above, the data reading or retrieval from the magneto-optical storage medium is effected based on a variation in quantity of the light which is reflected from, or transmitted through, the storage medium. Therefore, it is not required to use an expensive analyzer for detecting a variation in angle of rotation of a plane of polarization of the linearly polarized light reflected from or transmitted through the storage medium Therefore, no differential detecting device is required for detecting a very small variation of the linearly polarized light transmitted through the analyzer Thus, the apparatus of the invention is simple in construction, and economical to manufacture.

According to one preferred form of the invention, the apparatus comprises: (a) a light source device for producing linearly polarized light; (b) a polarizing beam splitter disposed so as to transmit the linearly polarized light, and having a joining surface; (c) a quarter-wave retardation element disposed between the polarizing beam splitter and the storage medium, the quarter-wave retardation element converting the linearly polarized light from the polarizing beam splitter into circularly polarized light, directing the circularly polarized light to the storage medium, and converting reflected light reflected from the storage medium into linearly polarized light; and (d) data-reading optical detector means for detecting a quantity of said reflected light reflected from the joining surface of the polarizing beam splitter.

In the above preferred form of the apparatus, the linearly polarized light from the light source device is highly efficiently transmitted through the polarizing beam splitter, while substantially 100% of the light reflected from the storage medium and converted into the linearly polarized light by the quarter-wave retardation element is reflected by the polarizing beam splitter, because the plane of vibrations of the reflected light from the storage medium is perpendicular to the plane of vibrations of the linearly polarized light emitted from the light source device. This means a considerable reduction in loss of the light from the light source device upon transmission thereof through the polarizing beam splitter, and of the light reflected from the storage medium upon reflection thereof from the polarizing beam splitter.

Further, the data reading or retrieval from the magneto-optical storage medium is effected based on a variation in total quantity of the light which is reflected from the storage medium. Therefore, it is not required to use an expensive analyzer for detecting a variation in angle of rotation of a plane of polarization of the linearly polarized light reflected from the storage medium. Therefore, no differential detecting device is required for detecting a very small variation of the linearly polarized light transmitted through the analyzer Thus, the apparatus of the invention is simple in construction, and economical to manufacture.

In accordance with a further embodiment of the invention, the apparatus comprises: (a) a light source device for producing a beam of light having no special plane of polarization; (b) a polarizing beam splitter disposed opposite to the light source device and transmitting a component of the beam of light from the light source device toward the storage medium as linearly polarized light, the polarizing beam splitter having a joining surface which reflects the remaining component of the beam of light; (c) data-reading optical detector means for detecting a total quantity of the linearly polarized light which is reflected from the storage medium, and thereby reading out the information from the storage medium, the data-reading optical detector means generating a first output signal corresponding to the total quantity of the linearly polarized light reflected from the storage medium; (d) monitoring optical detector means for detecting a total quantity of said remaining component of the beam of light reflected from the joining surface of the polarizing beam splitter, the monitoring optical detector means generating a second output signal corresponding to the total quantity of the remaining component of the light beam reflected from the joining surface; and (e) monitoring means, responsive to the second output signal, for monitoring an output of the light source device or the first output signal of the data-reading optical detector means.

In this embodiment, the output of the light source device or the output signal of the data-reading optical detector means for reading the stored information is monitored by the monitoring means which is responsive to the output signal generated from the monitoring optical detector means. Hence, irrespective of a possible variation in the output of the light source device, a high S/N ratio is given to the output signal of the data-reading optical detector means which corresponds to the total quantity of the light reflected from the storage medium and consequently represents the information stored on the storage medium. In this connection, the term "monitoring" is interpreted to mean an operation for regulating the quantity of light (output) produced by the light source device so that the produced light quantity is held constant, or alternatively an operation for eliminating, from the output signal of the data-reading optical detector means, noises which are caused by a variation in the output of the light source device.

According to a further embodiment of the invention, there is provided an apparatus for reading out information stored on a data storage medium made of a magneto-optical material, by emitting linearly polarized light from a light source device toward the storage medium via a polarizing beam splitter opposite to the light source device, and via a quarter-wave retardation element disposed between the polarizing beam splitter and the storage medium, characterized in that: the polarizing beam splitter is disposed such that a plane of polarization of P-type polarized light is slightly inclined with respect to a plane of polarization of the linearly polarized light from the light source device, the polarizing beam splitter having a joining surface which reflects a component of the linearly polarized light from the light source device; that monitoring optical detector means is provided for detecting a total quantity of said component of the linearly polarized light from the light source device, the monitoring optical detector means generating a first output signal corresponding to the detected total quantity of said component of the linearly polarized light; that data-reading optical detector means is provided for detecting a total quantity of the linearly polarized light which is reflected from the storage medium and reflected from the joining surface of the polarizing beam splitter, the data-reading optical detector means generating a second output signal corresponding to the detected total quantity of the linearly polarized light reflected from the storage medium and from the joining surface of the polarizing beam splitter; and that monitoring means is provided for monitoring an output of the light source device or the second output signal of the data-reading optical detector means, based on the first output signal of the monitoring optical detector means.

This alternative embodiment provides the same results as obtained in the preceding embodiment. That is, the output signal of the data-reading optical detector means is given a high S/N ratio and consequently the information stored on the storage medium is read out with minimum error.

According to a still further embodiment of the invention, the apparatus for reading out information from a magneto-optical data storage medium comprises: (a) a light source device for producing two beams of circularly polarized light having different wavelengths and different rotating directions, the two beams of circularly polarized light being concurrently incident upon the same memory location of the storage medium, and reflected from the storage medium; (b) a dichroic mirror for separating the two beams reflected from the storage medium, by a difference in wavelength between the two beams; and (c) a pair of data-reading optical detectors for detecting quantities of the two beams reflected from the storage medium, respectively, and generating output signals corresponding to the detected total quantities of the reflected beams to read the information from the storage medium.

In the above embodiment wherein two beams of circularly polarized light having different rotating directions are emitted toward the storage medium, the total quantities of these two beams of light which are reflected by the storage medium are changed in the opposite directions when the magnetizing directions of memory locations of the medium are changed from one to the other The two beams of light reflected from the storage medium are separated by the dichroic mirror by a difference in wavelength between the two beams, and the total quantities of these reflected beams are detected by the respective data-reading optical detectors Since the detected total quantities of the two beams of the reflected light of different wavelengths are changed in the opposite directions upon change in the magnetizing direction of the memory locations, there arises a relatively large amount of change in difference between the output signals of the two data-reading optical detectors. Therefore, the data reading operation based on this difference can be effected with increased accuracy, that is, a signal based on the difference between the outputs of the different data-reading optical detectors is given an increased S/N ratio.

BRIEF DESCRIPTION OF THE DRAWING

The above and other objects, features and advantages of the present invention will become more apparent from reading the following description of the preferred embodiments taken in conjunction with the accompanying drawings, in which.

DETAILED DESCRIPTION OF THE PREFERRED EMBODIMENTS

The invention will be described in detail, referring to the accompanying drawings which illustrate several preferred embodiments of the invention.

Figures 1, 2, 3, 4:
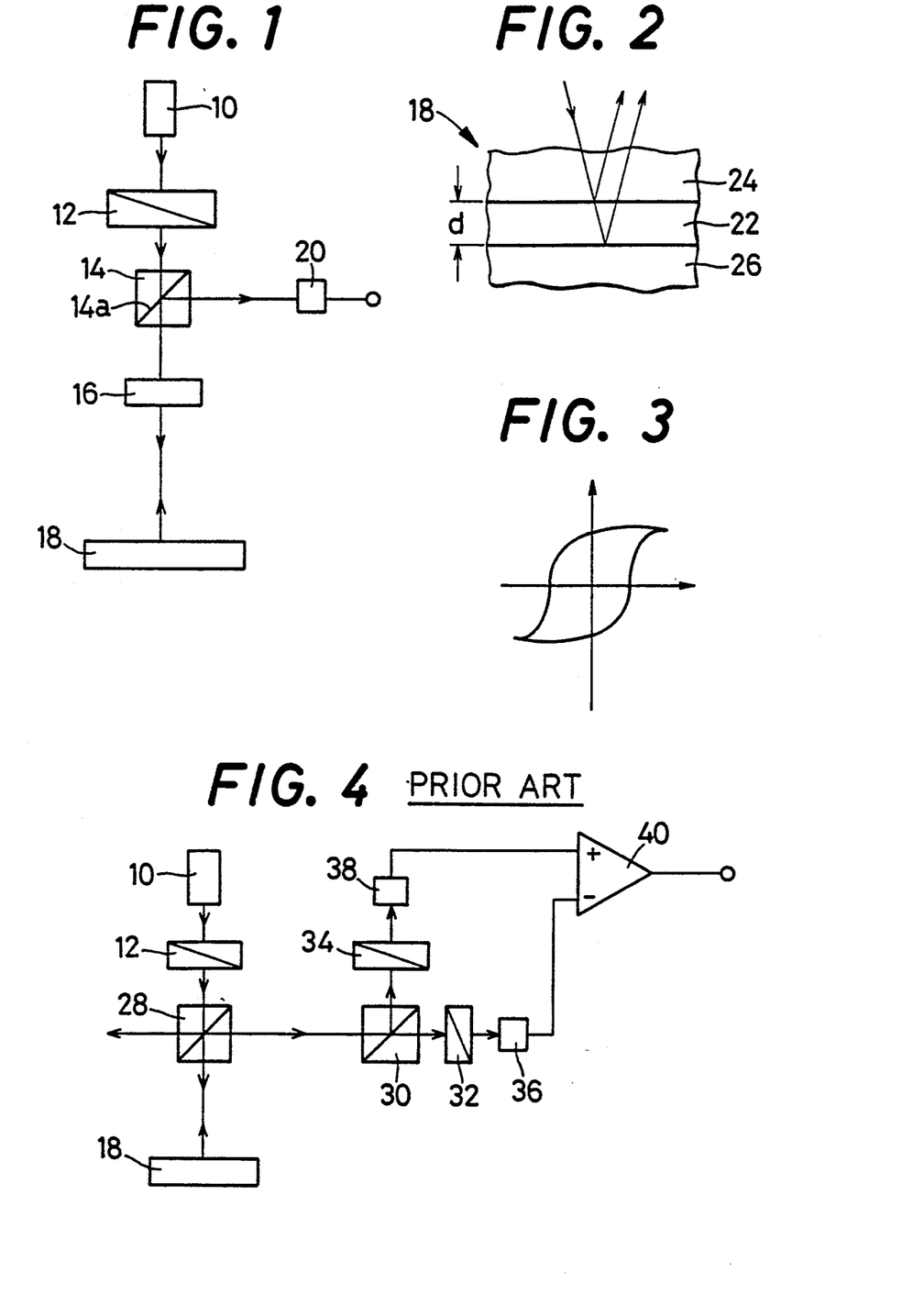
FIG. 1 is a schematic illustration of a general arrangement of one embodiment of an apparatus of the present invention for reading out or retrieving information from a magneto-optical data storage.
FIG. 2 is a fragmentary view in cross section of a magneto-optical disk from which the information is read out by the apparatus of FIG. 1.
FIG. 3 is a graphical representation of a magnetizing curve obtained from a magneto-optical material through experimentation on the apparatus of FIG. 1.
FIG. 4 is a schematic illustration of a general arrangement of a known magneto-optical data reading apparatus.

Referring first to FIG. 1, there is illustrated a general arrangement of an apparatus adapted to retrieve or read out information from a magneto-optical data storage medium. In the figure, a laser light source 10 produces a laser beam of light (plane-polarized light), which is polarized by a polarizer 12 into linearly polarized light. The linearly polarized light from the polarizer 12 is passed or transmitted through a polarizing beam splitter 14 and a quarter-wave retardation plate 16 (one-quarter wavelength element 16), and directed to a magneto-optical disk 18 at right angles to the surface of the disk 18 (i.e., the incident path being normal to the disk surface) The laser beam reflected from the magneto-optical disk 18 is transmitted back through the quarter-wave retardation plate 16 and transmitted into the polarizing beam splitter 14, which reflects the light toward a photodiode 20 which serves as data-reading optical detector means for detecting a quantity of light reflected from the polarizing beam splitter 14. Data on the magneto-optical disk 18 is retrieved or read out through detection of this quantity of the reflected light. The polarizer 12 serves to convert the output (laser beam) of the laser light source 10 (laser beam) into linearly polarized rays which are P-type polarized light incident upon a joining surface of the splitter 14 which will be described. The P-type polarized light is linearly polarized light which has a plane of wave vibrations parallel to the plane of incidence.

The polarizing beam splitter 14 is a kind of polarizing filter having the joining surface 14a which is inclined at 45 degrees to the incident light path (direction of light propagation). The polarizing beam splitter 14 transmits the P-type polarized light (with respect to the joining surface 14a), and highly efficiently reflects the S-type polarized light at right angles to the direction or axis of propagation of the incident light. The S-type polarized light is linearly polarized light which has a plane of wave vibrations perpendicular to the plane of incidence. The quarter-wave retardation plate 16 is disposed such that its optic axis is inclined 45 degrees to the direction of wave vibrations of the P-type polarized light from the polarizing beam splitter 14, in a plane perpendicular to the axis of light propagation. The quarter-wave retardation plate 16 acts as an element which converts the P-type polarized light into circularly polarized light, while it transmits the circularly polarized incident light and converts it into linearly polarized light. It is recognized that there are two forms of circularly polarized light in terms of direction of optical rotation of the electric vector as viewed in the direction of light propagation: the rotation being to the right or to the left. In the quarter-wave retardation plate 16, the circularly polarized light with right or left optical rotation as viewed in one predetermined direction along the light path is converted into the P-type or S-type polarized light, respectively, and conversely the P-type or S-type polarized light is converted into the circularly polarized light with right or left optical rotation.

As shown in FIG. 2 as a non-limiting example, the magneto-optical disk 18 is a multi-layer laminate structure which consists of a magneto-optical layer 22 having a thickness d of some hundred Å (angstroms), a glass substrate layer 24 and an aluminum reflector layer 26, the latter two layers 24 and 26 adhering to opposite sides of the magneto-optical layer 22 so as to sandwich the same 22. The magneto-optical layer 22 is made of amorphous GdTbFe, TbFe or GdCo, polycrystalline MnCuBi, single crystal of TbFeO$_3$ or garnet, or other materials which demonstrate additional optical anisotropy in the presence of a magnetic field. The magneto-optical layer 22 is locally magnetized in one of opposite directions perpendicular to its surface, i.e., in the direction of its thickness, whereby information is written on the magneto-optical layer 22. The glass substrate layer 24 is a layer for supporting and protecting the magneto-optical layer 22, and may be replaced by acrylic resin or other materials which are excellent in transparency. The aluminum reflector layer 26 is provided to aid the magneto-optical layer 22 in reflecting the incident light, that is, to increase the total quantity of light that is reflected from the magneto-optical layer 22. For this reason, the aluminum reflector layer 26 may be replaced by a layer of other suitable dielectric substance, where the situation allows a slight decrease in the total quantity of light reflection from the magneto-optical layer 22. The photodiode 20 detects an amount or intensity of the light reflected from the magneto-optical disk 18 via the polarizing beam splitter 14, and produces an electric signal corresponding to the detected amount or intensity of the reflected light from the magneto-optical disk 18.

The operation of the magneto-optical data reading apparatus with the foregoing construction will be described next.

The laser beam converted into P-type polarized light by the polarizer 12 is transmitted with high efficiency through the polarizing beam splitter 14, and converted into circularly polarized light by the quarter-wave retardation plate 16. The direction of optical rotation of the circularly polarized light is determined by an angle of inclination (45 degrees) between the optic axis of the quarter-wave retardation plate 16 and the plane of wave vibrations of the P-type polarized light. For example, the circularly polarized light produced by the plate 16 is adapted to have the optical rotation to the right as viewed in the direction of propagation of the light Upon this circularly polarized light with the right optical rotation being incident upon the magneto-optical disk 18, the incident light is reflected from a boundary surface between the glass substrate layer 24 and the magneto-optical layer 22, and from a boundary surface between the magneto-optical layer 22 and the aluminum reflector layer 26, so that the reflected light from the magneto-optical disk 18 is directed back toward the quarter-wave retardation plate 16. The light reflected from the magneto-optical disk 18 and incident upon the quarter-wave retardation plate 16 is in the form of circularly polarized light which has the left optical rotation as viewed in the direction of propagation of the light, contrary to the direction of rotation of the incident light which was directed to the magneto-optical disk 18. However, that circularly polarized light from the disk 18 has the right optical rotation when viewed in the direction from the plate 16 toward the magneto-optical disk 18, whereby the reflected light from the disk 18 is converted by the quarter-wave retardation plate 16 into the S-type polarized light, which is transmitted toward the beam splitter 14. Since the polarizing beam splitter 14 transmits of only the P-type polarized light as previously discussed, the S-type polarized light from the quarter-wave retardation plate 16 is reflected by the polarizing beam splitter 14 at right angles to the incident path, and thereby directed to enter the photodiode 20. The quantity of light received by the photodiode 20 is altered between two distinct values according to a change in the direction in which the magneto-optical layer 22 is magnetized perpendicularly to its surface, and the altered quantities of the incident light are represented by corresponding values of electric signals generated from the photodiode 20, whereby information written on the disk 18 through local magnetization thereof in one of opposite directions normal or perpendicular to the surface (in the direction across the thickness of the disk 18) are read out or retrieved in the form of the electric signals, while the magneto-optical disk 18 is moved to obtain an access to different memory locations thereof.

More specifically stated, it is generally known that where the direction of propagation of electromagnetic waves is parallel to the direction of magnetization of the magneto-optical layer 22, the so-called Faraday arrangement is established, wherein natural modes of light are two kinds of circularly polarized light $E+$, and $E-$, positive and negative (having right and left optical rotations of the electric vector, respectively). The refractive index (complex) $n'$ of the magneto-optical layer 22 with respect to these circularly polarized lights $E+$ and $E-$ is expressed by the following formula (1):

$$n'_{\pm} = {}^2(n_{\pm} + i k_{\pm})^2 = \epsilon\perp \pm i\epsilon' \ldots \qquad (1)$$

where,
$n_{\pm}$: Refractive index
$k_{\pm}$: attenuation coefficient
$\epsilon\perp$: diagonal components (xx, yy) of dielectric constant tensor of magneto-optical layer 22
$\epsilon'$: non-diagonal components of the above tensor
$i$: complex number The plus (+) and minus (−) signs (±) in the formula (1) correspond to the opposite directions in which the magneto-optical layer 22 is magnetized. Where the magnetizing direction of the magneto-optical layer 22 is reversed, the sign to be assigned is reversed, even if the conditions of incidence of the circularly polarized light are the same. Therefore, the amplitude reflectance $r^{\pm}$ of the light reflected from the magneto-optical layer 22 is expressed by the following formula (2):

$$r^{\pm} = \{r_{12}^{\pm} exp(-i\delta\pm)\} / \{1 + r_{12}^{\pm} \cdot r_{23}^{\pm} exp(-i\delta\pm)\} \ldots \qquad (2)$$

In the formula (2), $\delta\pm$ is a phase term associated with multiple reflection, and obtained from the following formula:

$$\delta\pm = 4\pi n_{\pm}' d/\lambda$$

where,
d: thickness of magneto-optical layer 22
$\lambda$: wavelength of light from light source 10

Further, the values $r_{12}^{\pm}$ and $r_{23}^{\pm}$ in the formula (2) are referred to as Fresnel's reflection coefficient, and expressed by the following formulas:

$$r_{12}^{\pm} = (n_1 - n_{\pm}')/(n_i + n_{\pm}')$$

$$r_{23}^{\pm} = (n_{\pm}' - n_3)/(n_{\pm}' + n_3)$$

Thus, it is apparent from the formula (2) that the amplitude reflectance $r^{\pm}$ when the refractive index is $n_-'$ is different from that when the refractive index is $n_-'$, and that the total quantity of reflected light from the magneto-optical layer 22 when the circularly polarized light with right optical rotation is incident upon the magneto-optical layer 22 at right angles to its surface, is different from that when the circularly polarized light with left optical rotation is incident in the same manner. In other words, while the magneto-optical layer 22 is kept exposed to the circularly polarized light with the same rotating direction (right or left), the total quantity of the reflected light from the layer 22 is altered between two distinct values corresponding to the opposite directions in which the memory locations of the magneto-optical layer 22 are magnetized normally or perpendicularly to its surface. This changing total quantity of the reflected light from the magneto-optical layer 22 is utilized to read out or reproduce signals (information) which have been written on the layer 22 through local magnetization of its multiplicity of memory locations. A graph in FIG. 3 illustrates a magnetization curve obtained from the magneto-optical layer 22 through experiment according to the present embodiment of the invention described hitherto. The graph shows that the reversal of the direction of magnetization of the layer 22 causes a variation in total quantity of the reflected light from the layer 22.

As previously indicated, the total quantity of the light reflected from the magneto-optical layer 22 is altered between two different values corresponding to the two magnetizing directions of the layer 22 perpendicular to its surface, and the altered total quantities are detected by the photodiode 20 which produces electric signals corresponding to the altered total quantities, whereby the information written on the layer 22 are reproduced in the form of the electric signals from the photodiode 20. This embodiment of the invention eliminates elements required on a known apparatus for data reading from a magneto-optical disk, such as an expensive analyzer for detecting rotation of the plane of wave vibrations of the reflected linearly polarized light, and a differential detector for detecting an extremely small variation in the detected linearly polarized light. The elimination of such elements contributes to structural simplification and cost saving of the instant apparatus.

For easier understanding of the invention, there will be described an example of a known apparatus, referring to FIG. 4, wherein the arrangement uses the Kerr effect (Kerr magneto-optical or electro-optic effect) or Faraday effect, that is, the plane of polarization (wave vibrations) of linearly polarized light when reflected from or transmitting through a magneto-optical material is rotated in a direction which is determined by the direction in which the magneto-optical material is magnetized. In the figure, a laser beam of light from a light source 10 is linearly polarized by a polarizer 12, and the linearly polarized light passing through a half mirror (semi-transparent mirror) 28 strikes a magneto-optical disk 18. The disk 18 reflects the incident light, and the reflected light from the disk 18 is reflected from the half mirror 28 toward another half mirror 30 The half mirror 30 splits the incident light into two beams of light, one directed toward an analyzer 32, and the other directed toward another analyzer 34. The two analyzers 32, 34 are adapted to receive the respective two beams of the linearly polarized light whose rotating directions of the plane of wave vibrations correspond to the opposite magnetizing directions of a magneto-optical layer 22 of the disk 18 perpendicular to its surface. Photodiodes 36 and 38 receive these two beams of the linearly polarized light passing through the analyzers The outputs of the photodiodes 36, 38 are applied respectively to two inputs of a differential amplifier 40 which produces an output signal corresponding or proportional to a difference between the signals applied to its inputs from the photodiodes 36, 38. Generally, the angle of rotation of the Kerr or Faraday effect is extremely small, in a range of about 0.3 to 0.5 degree. Therefore, exact detection of this angle of rotation requires high operating accuracy of the analyzers 32, 34, which means a high cost of these detectors Further, a differential detecting device such as the differential amplifier indicated above is additionally required in order to obtain an output of high S/N (signal/noise) ratio. Accordingly, the overall arrangement of the apparatus is complicated, and the total cost is increased.

According to the foregoing embodiment of the invention, the analyzers 32 and 44, and one of the photodiodes 36 and 38, and the differential amplifier 40 used in the known apparatus are eliminated, whereby the apparatus of the invention is simplified and consequently available at a reduced cost.

The present embodiment has an additional advantage over the known apparatus. That is, the elimination of the half mirrors 28, 30 used in the known apparatus minimizes a loss of light during a travel of the light in the apparatus. Described in more detail, the half mirror 28 of FIG. 4 transmits only a half of the entire quantity of light from the laser light source 10, and the half mirror 30 delivers halves of the entire reflected light from the magneto-optical disk 18, toward the photodiodes 36 and 38 via the analyzers 32 and 34, respectively. Even on the assumption that there is no loss of light at the other parts of the apparatus, only a quarter of the laser light from the source 10 is received by the photodiode 36, 38. This reduction in quantity of light received at the photodiode 36, 38 is not encountered in the instant embodiment of the invention wherein the substantially entire quantity of the laser beam of light reflected from the magneto-optical layer 22 is effectively utilized by the photodiode 20.

Figure 5:
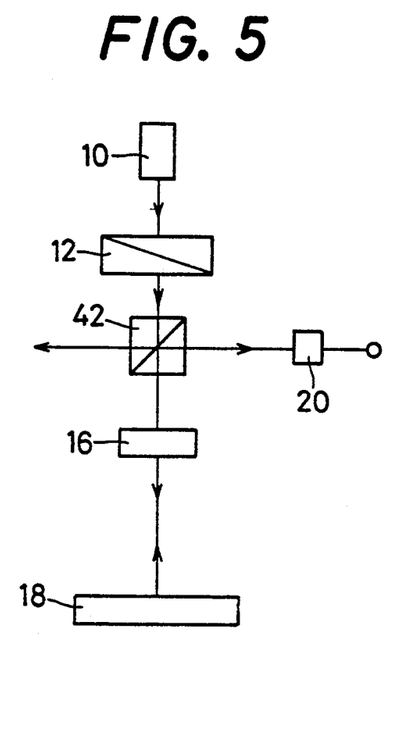
FIG. 5 is a schematic view showing a general arrangement of another embodiment of the invention.

Referring next to FIG. 5, another embodiment of the invention will be described. The same reference numerals as used in FIGS. 1 and 2 are used in FIG. 5 to identify the corresponding parts, the description of which is omitted herein.

In this alternative embodiment, a half mirror 42 is used in place of the polarizing beam splitter 14 of the apparatus of FIG. 1. According to the embodiment of FIG. 5, the quantity of the light emitted from the laser light source 10 and linearly polarized by the polarizer 12 is reduced to substantially 50% in transmission through the half mirror 42. Further, the total quantity of the light reflected from the magneto-optical layer 22 and passing through the quarter-wave retardation plate 16 is also reduced to substantially 50% when the incident light is reflected by the half mirror 42 and directed toward the photodiode 20. Although the quantity of the light received by the photodiode 20 is reduced, the arrangement of this embodiment has the same advantages as the preceding embodiment of FIG. 1, that is, simplified structure and reduced cost of manufacture.

Figure 6:
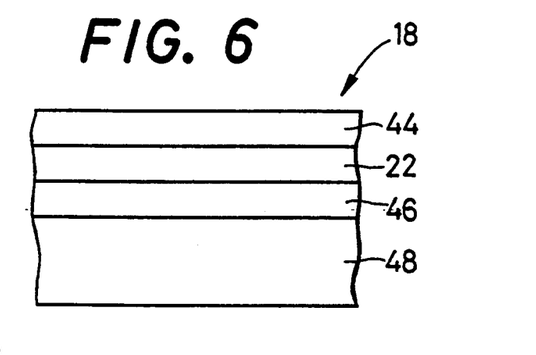
FIG. 6 is a fragmentary view in cross section of another form of a magneto-optical disk alternative to that shown in FIG. 2.

A more preferred form of the magneto-optical disk 18, alternative to that shown in FIG. 2, is illustrated in FIG. 6 in cross section, wherein the magneto-optical layer 22 is sandwiched by two anti-reflection dielectric layers 44 and 46. A laminate of these layers 22, 44 and 46 adhering to each other is bonded to an aluminum reflector substrate 48 (metallic reflector plate), whereby the disk 18 is fabricated in the form of a laminate of the four layers 44, 22, 46 and 48. The dielectric layers 44 and 46 are made of silicon dioxide ($SiO_2$) and silicon oxide ($SiO$), and have thicknesses of about 1100 and 1800 Å (angstroms), respectively. The magneto-optical layer 22 is, for example, made of GdTbFe, and has a thickness of about 125 A (angstroms), and a refractive index n' which is obtained 5 from the following formula (3):

$$n' = (2.3 - 3.0i) \pm (0.025 - 0.01i) \ldots \quad (3)$$

Experiments conducted by the present inventor using the magneto-optical disk 18 of the above construction demonstrated an approximate 1% difference in reflectance $[=(|r^{+2}|-^{-2}|)\times 100]$, i.e. approximate 3% reflectance ratio $[=(|r^{+2}|-|r^{-2}|)/|r^{+2}|\times 100]$, when the direction of magnetization of the magneto-optical layer 22 is changed. In this connection, it is generally noted that dielectric layers 44, 46 sandwiching the magneto-optical layer 22 are required to have a high refractive index which is actually not obtainable, if a high reflection efficiency is sought by means of such multiple reflection as described above. According to the construction of the magneto-optical disk 18 shown in FIG. 6, however, the dielectric layer 46 below the magneto-optical layer 22, and the aluminum reflector substrate 48 (metallic reflector layer) serve to provide an optimum imaginary refractive index suitable for the multiple reflection of the disk 18.

Figure 7:
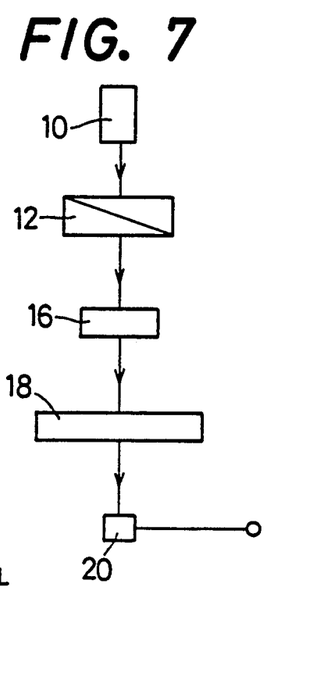
FIGS. 7-9 are schematic illustrations of general arrangements of further embodiments of the invention.

While the preceding embodiment is arranged such that the information written on the magneto-optical layer 22 is reproduced (read out) based on a variation in total quantity of the circularly polarized light reflected from the magneto-optical layer 22, the information may be equally suitably reproduced based on a variation in quantity of the incident light which is transmitted through the magneto-optical layer 22, because the quantity of the incident light is the sum of the total quantity of the light reflected from the magneto-optical layer 22 and the total quantity of the light passing through the layer 22. Stated more particularly, the transmittance (transmission factor) $t\pm$ of the light passing through the magneto-optical layer 22 which satisfies the formula (1) previously indicated, is expressed by the formula (4) which follows:

$$t^{\pm} = \frac{t_{12}^{\pm} \cdot t_{23}^{\pm} \cdot \exp(-i \cdot \delta^{\pm}/2)}{1 + r_{12}^{\pm} \cdot r_{23}^{\pm} \cdot \exp(-i \delta^{\pm})} \quad (4)$$

where
$\delta^{\pm} = 4\delta n_{\pm}'d/\lambda$
$r_{12}^{\pm} = (n_1 - n_{\pm}')/(n_1 + n_{\pm}')$
$r_{23}^{\pm} = (n_{\pm}' - n_3)/(n_{\pm}' + n_3)$
$t_{12}^{\pm} = 2n_1/(n_1 + n_{\pm}')$
$t_{23}^{\pm} = 2n_{\pm}'/(n_{\pm}' + n_3)$ From the above formula (4), it is apparent that the amplitude transmittance $t^+$ when the refractive index is $n_+'$ is different from the amplitude transmittance $t^-$ when the refractive index is $n_-'$, and it is further apparent that the quantity of light passing through the magneto-optical layer 22 when the circularly polarized light with right optical rotation is incident upon the magneto-optical layer 22 at right angles to its surface, is different from that when the circularly polarized light with left optical rotation is incident in the same manner. In other words, while the magneto-optical layer 22 is kept exposed to the circularly polarized light with the same rotating direction (right or left), the total quantity of the light passing through the layer 22 is altered between two distinct values corresponding to the opposite directions in which the memory locations of the magneto-optical layer 22 are magnetized normally or perpendicularly to its surface. This changing total quantity of the light transmission through the magneto-optical layer 22 is utilized to reproduce or read out information which have been written on the layer 22 through local magnetization of its multiplicity of memory locations. In the case where the data on the disk 18 is reproduced through utilization of a variation in total quantity of the light transmitted through the magneto-optical layer 22 as indicated above, the layer 22 is required to have a relatively small thickness. In this embodiment shown in FIG. 7, the apparatus is operable without an element for separation of the incident light and the reflected light, that is, without the polarizing beam splitter 14 used in the embodiment of FIG. 1, or without the half mirror 42 used in the embodiment of FIG. 5. In this respect, the embodiment of FIG. 7 is advantageous. In this alternative embodiment, a dielectric transparent layer is used in place of the aluminum reflector layer 26 or aluminum reflector substrate 48 of FIGS. 2 and 6.

The light source 10 and the polarizer 12 shown in FIGS. 1, 5 and 7 cooperate to constitute a light source device. The light source 10 which is a laser in the illustrated embodiments, may be replaced by a source of other monochromic light. Further, the polarizer 12 is not necessary in the case where the light source 10 is a laser of external resonance type, semiconductor laser or other types of light source which produce linearly polarized light. When a polarizing beam splitter is used as illustrated at 14 in FIG. 1, a light source may be that which produces circularly polarized light, as the splitter permits transmission of only the P-type polarized light.

Next, there will be described a further embodiment of the invention, which is adapted for improvement in S/N ratio by eliminating noises due to variation in quantity of the light produced by the light source device.

Figure 8:
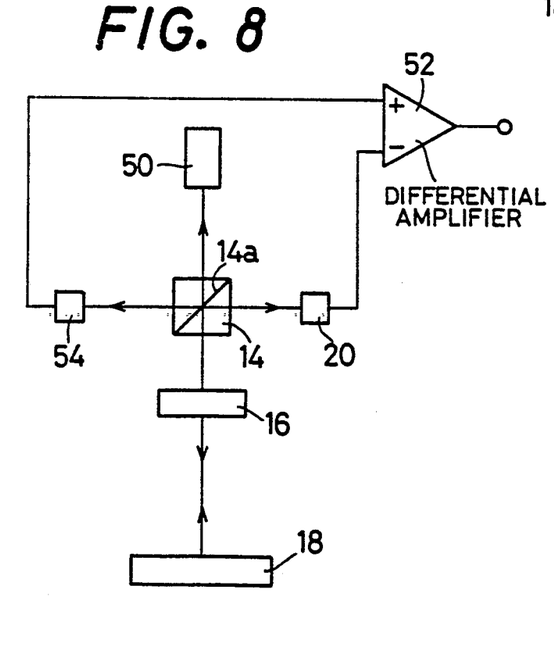

There is shown in FIG. 8 a light source device in the form of a laser light source 50 which is a laser of internal resonance type or the like which produces a beam of unpolarized light having no special plane of polarization. The laser beam produced from the light source 50 is transmitted through a polarizing beam splitter 14 and a quarter-wave retardation plate 16, and directed to a magneto-optical disk 18 such that the incident path is perpendicular to the surface of the disk 18. The laser beam reflected from the magneto-optical disk 18 is passed through the quarter-wave retardation plate 16 and reflected again by the polarizing beam splitter 14. The light reflected from the splitter 14 is received by a photodiode 20 which serves as data-reading optical detector means for detecting the total quantity of light reflected from the magneto-optical disk 18 in order to reproduce the information stored on the disk 18, as previously discussed.

More particularly stated, the photodiode 20 senses the quantity (intensity) of the incident light from the polarizing beam splitter 14, i.e., the light reflected from the magneto-optical disk 18, and produces an electric signal corresponding to the detected quantity (intensity) of the incident light. The produced electric signal is applied to one input of a differential amplifier 52. In the meantime, since the laser light incident upon the polarizing beam splitter 14 is a beam of light which, unlike circularly polarized light, has no special plane of polarization, only the P-type polarized light of the laser beam from the light source 50 is transmitted through the polarizing beam splitter 14, and the remaining component of the laser beam is reflected from the polarizing beam splitter 14 and received by a photodiode 54 which serves as monitoring optical detector means for sensing the quantity of light produced by the light source 50. The differential amplifier 52 also receives the output signal of the photodiode 54, and produces an output signal based on a difference between the output signals of the photodiodes 20 and 54.

According to the present embodiment of FIG. 8, only the P-type polarized light of the laser beam (having no special plane of polarization) from the light source 50 is transmitted through the polarizing beam splitter 14, and directed to the magneto-optical disk 18 through the quarter-wave retardation plate 16. Concurrently, the remaining component of the laser beam is reflected from the polarizing beam splitter 14 and received by the photodiode 54. The quantity of the light received by the photodiode 54 corresponds to or represents the quantity of the output (variation in output) of the light source 50.

The P-type polarized light transmitted through the polarizing beam splitter 14 is circularly polarized by the quarter-wave retardation plate 16. The direction of optical rotation of the circularly polarized light is determined by an angle of inclination (45 degrees) between the optic axis of the quarter-wave retardation plate 16 and the plane of wave vibrations of the P-type polarized light. For example, the circularly polarized light produced by the plate 16 is adapted to have the optical rotation to the right as viewed in the direction of propagation of the light. Upon this circularly polarized light with the right rotation being incident upon the magneto-optical disk 18, the incident light is reflected from a boundary surface between the glass substrate layer 24 and the magneto-optical layer 22, and from a boundary surface between the magneto-optical layer 22 and the aluminum reflector layer 26, whereby the reflected light from the magneto-optical disk 18 is directed back toward the quarter-wave retardation plate 16. The light reflected from the magneto-optical disk 18 and incident upon the quarter-wave retardation plate 16 is in the form of circularly polarized light which has the left optical rotation as viewed in the direction of propagation of the light, contrary to the direction of rotation of the incident light which was directed to the magneto-optical disk 18. However, that circularly polarized light from the disk 18 has the right optical rotation when viewed in the direction from the plate 16 toward the magneto-optical disk 18, whereby the reflected light from the disk 18 is converted by the quarter-wave retardation plate 16 into the S-type polarized light, which is transmitted toward the polarizing beam splitter 14. Since the polarizing beam splitter 14 transmits only the P-type polarized light as previously discussed, the S-type polarized light from the quarter-wave retardation plate 16 is reflected by the polarizing beam splitter 14 at right angles to the direction of incidence, and thereby directed to enter the photodiode 20. The quantity of light received by the photodiode 20, that is, the total quantity of the light reflected from the magneto-optical disk 18 is altered between two distinct values according to a change in the direction in which the magneto-optical layer 22 is magnetized perpendicularly to its surface, in the same operating manner as described in connection with the first embodiment of FIG. 1. The altered total quantities of the light are represented by corresponding electric signals generated from the photodiode 20 while the magneto-optical disk 18 is moved, whereby information written on the disk 18 through local magnetization thereof in one of the opposite directions normal or perpendicular to the surface are read out or retrieved in the form of the electric signals. Generally, the difference in the total quantity of the reflected light from the magneto-optical disk 18 due to change in the direction of magnetization is less than few or several percent. Therefore, a variation in the output of the light source 50 which causes noises, will reduce the S/N ratio and consequently increase, to some extent, errors in reading out the information from the magneto-optical disk 18.

According to the present invention, however, a variation in the signal level of the differential amplifier 52 photodiode due to a variation in the output of the light source 50 is eliminated based on a signal produced from the photodiode 54, which signal is varied corresponding to the variation in the output of the light source 50. As a result, this embodiment provides a high S/N ratio of the differential amplifier 52 and assures a minimum error in reading out the data from the magneto-optical disk 18. Put in more detail, the quantity of light received by the photodiode 20, 54 is increased or decreased as the quantity of light produced from the light source 50 is increased or decreased, for example, due to a drift in the supply voltage, or due to a chronological change in output characteristics of the light source 50. However, since the output signals of the photodiodes 20 and 54 are applied to the inputs of the differential amplifier 52, the amplifying operation of the differential amplifier 52 is effected based on a difference between the output signals of the photodiodes 20 and 54, i.e., based on an input signal which does not include the output variation of the light source 0. As a result, the output signal of the differential amplifier 52 does not include noises due to the output variation of the light source 50, thereby obtaining a high S/N ratio irrespective of the output variation of the light source 50. Thus, the differential amplifier 52 serves as monitoring means for sensing a variation in the output of the photodiode 20 due to the output variation of the light source 50. In other words, the differential amplifier 52 constitutes noise eliminating means for removing noises of the light source 50.

Figure 9:
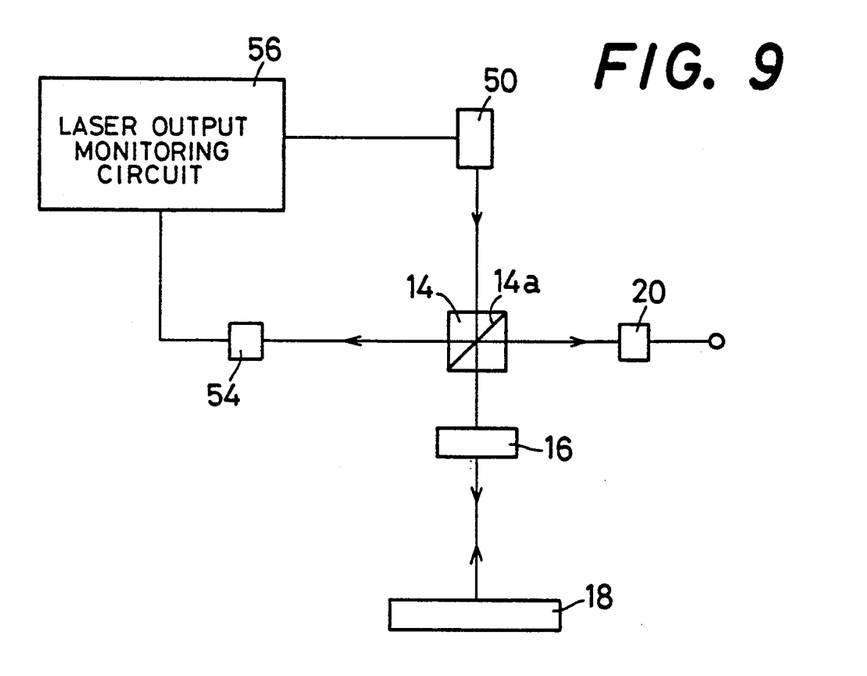

Referring to FIG. 9, a further embodiment of the invention will be described. In this embodiment, the output of the light source 50 is monitored based on the output signal of the photodiode 54.

Figure 10:
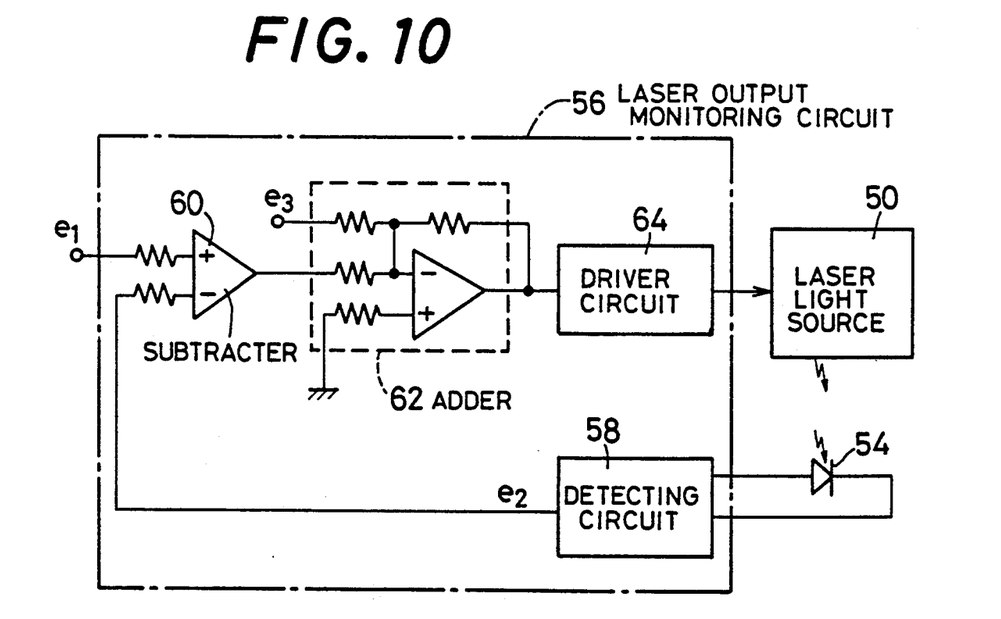
FIG. 10 is a diagrammatic view showing a laser output monitoring circuit used in the apparatus of FIG. 9.

In the figure, the output signal of the photodiode 54 which serves as monitoring optical detector means, is applied to a laser output monitoring circuit 56 which is provided to supply drive power to the light source 50 so that the output of the light source 50 may be kept constant. Described more specifically, the monitoring circuit 56 includes a detecting circuit 58 connected to the photodiode 54, and a subtracter 60 having an input connected to the output of the detecting circuit 58, as shown in FIG. 10. The detecting circuit 58 is adapted to supply the subtracter 60 with a feedback voltage $e_2$ which corresponds to the quantity of light received by the photodiode 54. A predetermined reference voltage $e_1$ is applied to the other input of the subtracter 60, which supplies an adder 62 with a voltage which is proportional to a difference between the reference and feedback voltages $e_1$ and $e_2$. The adder 62 also receives a reference voltage $e_3$ which corresponds to the predetermined output level of the light source 50. This reference voltage $e_3$ is added to the output voltage of the subtracter 60, and the sum is applied to a driver circuit 64 which supplies the light source 50 with electric power corresponding to the output voltage of the adder 62. Thus, the light source 50 powered by the driver circuit 64 produces a laser beam so that the output quantity is proportional to the output voltage of the driver circuit 64.

In the laser output monitoring circuit 56 with the above arrangement, if the output of the light source 50 is increased, for example, due to a drift of the driver circuit 64 or a variation in output characteristics of the light source 50, the feedback voltage $e_2$ is increased, and consequently the output voltage of the subtracter 60 to be applied to the adder 62 is decreased. As a result, the output voltage of the adder 62 is decreased, and the electric power to be supplied by the driver circuit 64 to the light source 50 is decreased, whereby the output of the light source 50 is reduced. Conversely, if the output of the light source 50 is decreased and the feedback voltage $e_2$ is lowered, the output voltage of the subtracter 60 is increased, and accordingly the power supply by the driver circuit 64 to the light source 50 is increased, whereby the output of the light source 50 is increased. In this manner, the quantity of the light produced by the light source 50 is kept at a constant level. Thus, the laser output monitoring circuit 56 serves as monitoring means for maintaining a constant output of the light source 50 in response to the output of the photodiode 54. Stated the other way, the monitoring circuit 56 constitutes monitoring means in the form of a feedback regulator circuit for controlling the light source 50 to provide a constant output.

As described above, the alternative embodiment of FIG. 9 is capable of maintaining the output of the light source 50 at a constant level, and thus preventing noises which could otherwise be included in the output signal of the photodiode 20 due to variation in the quantity of light produced by the light source 50. Accordingly, the S/N ratio of the output signal of the photodiode 20 is considerably increased, and the chance for errors in data retrieval from the magneto-optical disk 18 is greatly reduced.

Figure 11:
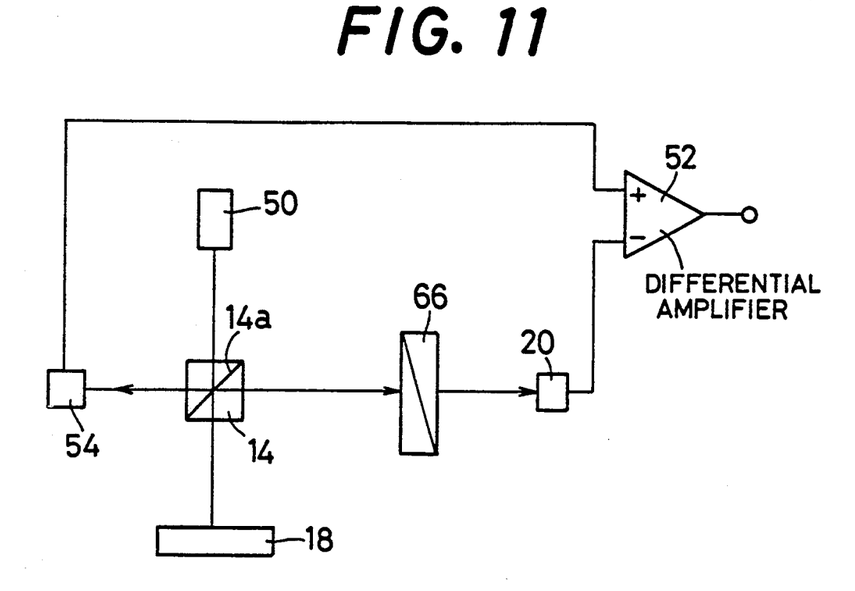
FIG. 11 is a schematic view illustrating still another embodiment of the invention.

While the preceding embodiments of FIGS. 1, 5, 8 and 9 are all concerned with a magneto-optical data reading or retrieving apparatus of the type in which information written on the magneto-optical disk 18 is read out (retrieved or reproduced) by detecting a change in total quantity of the light reflected from the magneto-optical layer 22 of the disk 18, the principle or technological concept of the present invention is also applicable to a magneto-optical data reading apparatus of the type wherein an angle of rotation of the plane of polarization (wave vibration) of linearly polarized light reflected from the magneto-optical layer 22 is detected to accomplish data retrieval from the magneto-optical disk 18, as illustrated in FIG. 11.

In this modified embodiment of FIG. 11, the P-type polarized light of the laser beam having no special plane of polarization, which is produced by the light source 50, is transmitted through the polarizing beam splitter 14, and then directly received by the magneto-optical disk 18. The P-type polarized incident light is reflected from the disk 18, and the plane of wave vibrations (polarization) of linearly polarized light is rotated through a given angle, according to the Kerr effect. This angle of rotation is determined by the direction in which the magneto-optical layer 22 is magnetized. The reflected light from the disk 18 is then incident upon the polarizing beam splitter 14, and the component of the incident light whose plane of vibrations has been rotated by the Kerr effect is reflected by the polarizing beam splitter 14. The reflected light from the polarizing beam splitter 14 is transmitted through an analyzer 66 and received by the photodiode 20. The analyzer 66 is adapted to permit transmission of the linearly polarized light whose plane of polarization has been rotated, upon reflection by the magneto-optical layer 22, corresponding to the magnetizing direction of the magneto-optical layer 22. In the present embodiment, therefore, the output of the photodiode 20 is changed between two values corresponding to the opposite directions in which the magneto-optical layer 22 is magnetized normally to its surface. Thus, the information written on the magneto-optical layer 22 may be read out based on the output signal of the photodiode 20. The light received by the photodiode 20 includes noises corresponding to a variation in output of the light source 50. To eliminate these noises, the present embodiment uses the photodiode 54 which detects the output variation of the light source 50, and the differential amplifier 52 which receives the output signals of the photodiodes 54 and 20, as in the embodiment of FIG. 8. Since the output of the photodiode 54 is subtracted from the output of the photodiode 54 by the differential amplifier 52, the output of the amplifier 52 is given a high S/N ratio irrespective of the output variation of the light source 50, whereby the information stored on the magneto-optical disk 18 can be read out with increased accuracy.

Figure 12:
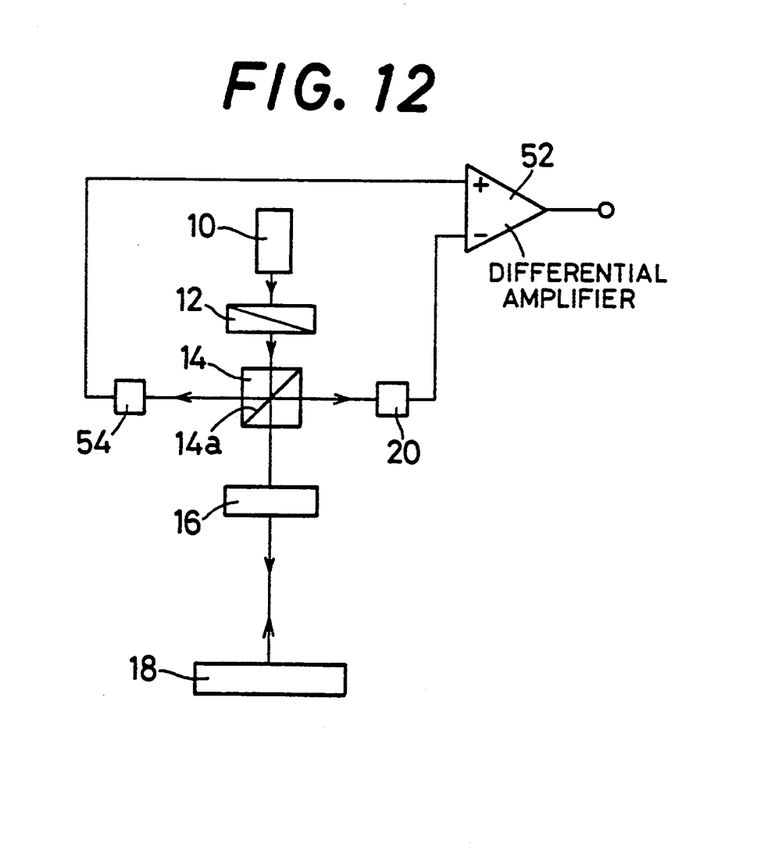
FIGS. 12 and 13 are views corresponding to FIGS. 8 and 9, illustrating two different arrangements for transmission of linearly polarized light through a polarized polarizing beam splitter, respectively.
Figure 13:
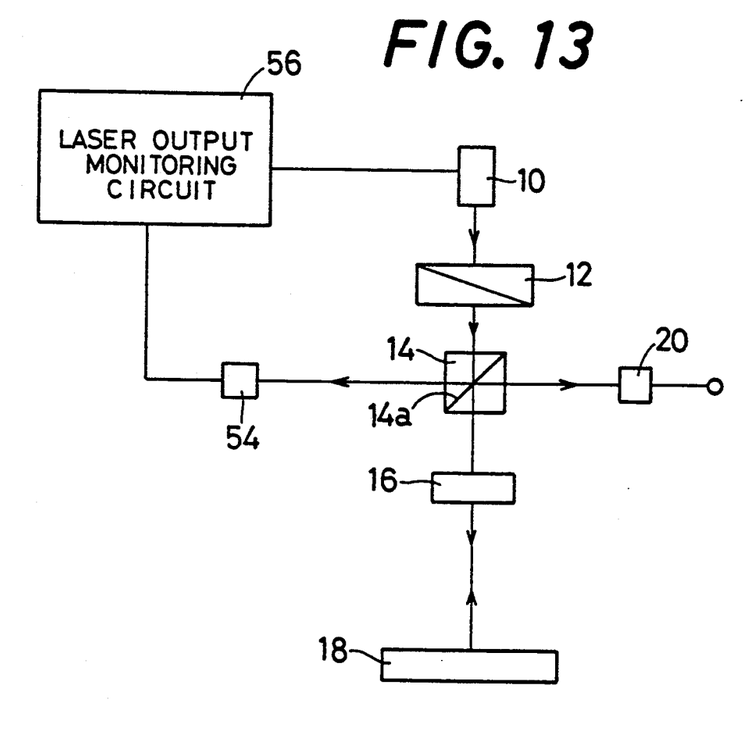

While in the embodiments of FIGS. 8, 9 and 11 a beam of light having no special plane of polarization is transmitted from the light source 50 to the polarizing beam splitter 14, the invention may be embodied so that linearly polarized light is received by the polarizing beam splitter 14, as illustrated in FIGS. 12 and 13 which correspond to FIGS. 8 and 8. Since these alternative embodiments of FIGS. 12 and 13 are identical to the embodiments of FIGS. 8 and 9 except in the kind of light to be received by the polarizing beam splitter 14, the description of the other aspects of the embodiments of FIGS. 8 and 9 is omitted.

In FIGS. 12 and 13, the laser beam of light produced by the laser light source 10 is linearly polarized by the polarizer 12. The linearly polarized light is transmitted through the polarizing beam splitter 14 and the quarter-wave retardation plate 16, and incident normally upon the magneto-optical disk 18. The incident light is reflected from the magneto-optical disk 18 and directed back to the polarizing beam splitter 14 via the quarter-wave retardation plate 16. The light is reflected by the polarizing beam splitter 14 toward the photodiode 10 for detecting the total quantity of the light which has been reflected by the magneto-optical disk 18. The polarizer 12, which receives the laser light from the light source 50, transmits the linearly polarized light whose plane of polarization is slightly inclined with respect to a plane of polarization of the P-type polarized light which can be transmitted through the joining surface 14a of the polarizing beam splitter 14. That is, the polarizer 12 and the polarizing beam splitter 14 are disposed relative to each other so that the plane of polarization of the P-type polarized light transmitted through the polarizing beam splitter 14 is inclined a slight angle with respect to the plane of polarization of the linearly polarized light from the polarizer. In the present embodiments, the polarizer 12 is disposed so that the plane of wave vibrations of the linearly polarized light from the polarizer 12 is slightly deviated from the plane of polarization of the P-type polarized light which can be transmitted through the polarizing beam splitter 14. With this arrangement, the component of the linearly polarized light from the polarizer 12 is reflected by the polarizing beam splitter 4 toward the photodiode 54 which serves as monitoring optical detector means for sensing the output of the light source 50. As the total quantity of the reflected light detected by the photodiode 54 is a function of a variation in output of the light source 50, the output of the photodiode 54 is applied to the differential amplifier 52 (monitoring means) in the embodiment of FIG. 12 (as in the embodiment of FIG. 8), or applied to the laser output monitoring circuit 56 (another monitoring means) in the embodiment of FIG. 13 (as in the embodiment of FIG. 9), whereby the noises otherwise included in the output of the photodiode 20 due to output variation of the light source 50 are eliminated, or the output of the light source 50 is monitored and maintained at a constant level, in the same manner as previously described in association with the embodiments of FIGS. 8 and 9.

Although the light source device used in the embodiments of FIGS. 12 and 13 to emit the linearly polarized light to the polarizing beam splitter 14 is constituted by the light source 10 and the polarizer 12, it is possible to use a semi-conductor laser element, a laser of external oscillation type, or other device which is adapted to produce linearly polarized light.

While the differential amplifier 52 or monitoring circuit 56 is used as monitoring means in the embodiments of FIGS. 8, 9, 12 and 13, other suitable devices or circuits may be used, provided such monitoring means are capable of eliminating from the output of the photodiode 20 noises which are caused by output variations of the light source 50, or capable of maintaining the output of the light source 50 at a constant level.

Figure 14:
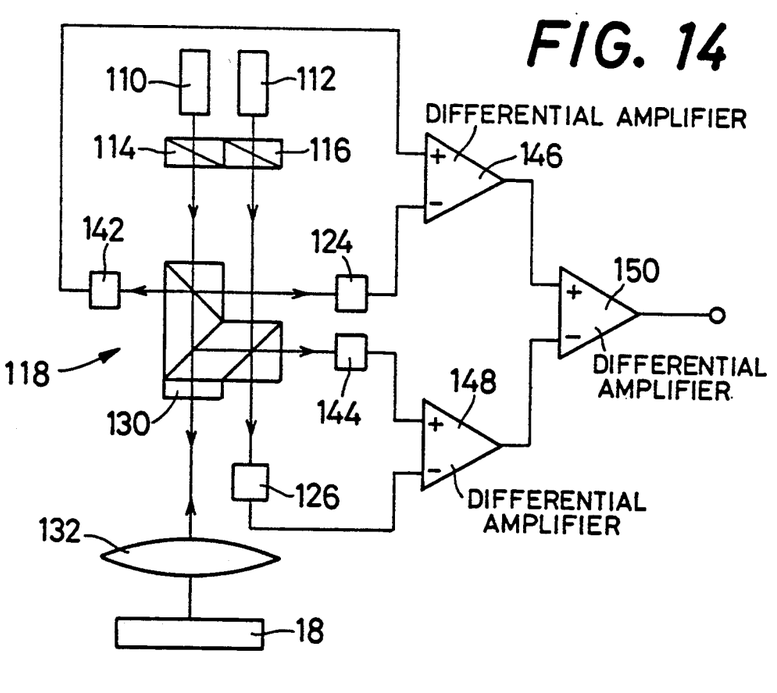
FIG. 14 is a schematic illustration of a further embodiment of the invention.
Figure 15:
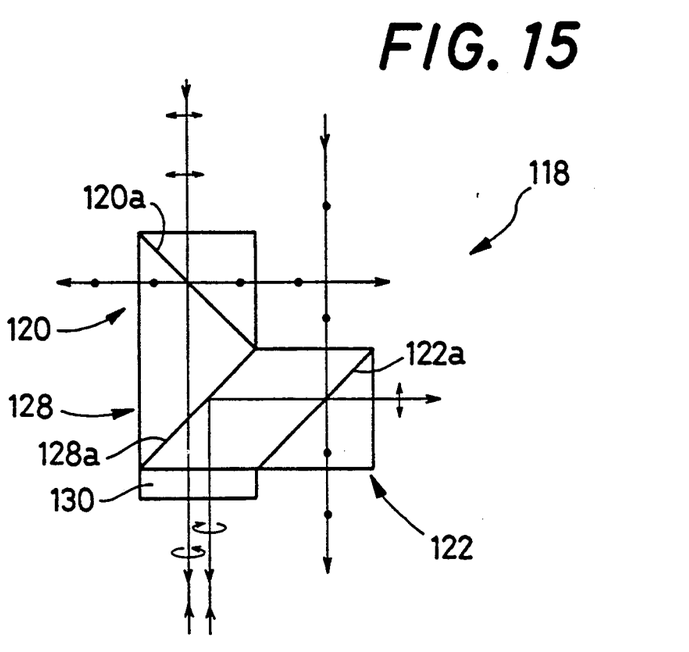
FIG. 15 is a schematic view showing a part of the apparatus of FIG. 14.

Referring to FIGS. 14 and 15, a still further preferred embodiment of the invention will be described.

In this embodiment, two beams of laser light are produced by a pair of laser light sources 110 and 112 each of which is identical to the laser light source 10 of the embodiment of FIG. 1. The two beams of light are parallel to each other, but have different wave lengths. These laser beams are linearly polarized by a corresponding pair of polarizers 114 and 116, and the polarized light beams are directed to respective polarizing beam splitter components 120 and 122 of an optical structure 118. As illustrated in detail in FIG. 15, the polarizing beam splitter components 120 and 122 are provided with joining surfaces 120a and 122a which are perpendicular to each other and inclined at 45 degrees to the direction of light propagation. The planes of polarization of the linearly polarized light beams from the polarizers 114 and 116 are slightly inclined with respect to the planes of polarization of the P-type and S-type polarized light beams which can be transmitted through the joining surfaces 120a and 122a, respectively. Consequently, a major component of the linearly polarized light from the polarizer 114 is transmitted through the jointing surface 120a, while a fractional component of the light is reflected from that surface 120a and received by a photodiode 124 which serves as first monitoring optical detector means. Similarly, a major component of the linearly polarized light from the polarizer 116 is component of the light is transmitted through that surface 122a and received by a photodiode 126 which serves as second monitoring optical detector means.

Each polarizing beam splitter portion 120, 122 is a kind of polarizing filter which transmits P-type polarized light, but reflects S-type polarized light. The P-type polarized light is linearly polarized light which has a plane of wave vibrations in the plane of incidence, and the S-type polarized light is linearly polarized light which has a plane of polarization which is perpendicular to the plane of incidence. The optical structure 118 includes a dichroic mirror component 128 having a mirror surface 128a which is perpendicular to the joining surface 120a and parallel to the jointing surface 122a. The mirror surface 128a of the dichroic mirror portion 128 permits effective transmission therethrough of the light in one range of wavelength including the wavelength of the laser light from the light source 110, but reflects the light in another range of wavelength including the wavelength of the laser light from the light source 112. The linearly polarized light (P-type) transmitted through the jointing surface 120a is transmitted through the mirror surface 128a, and directed to the magneto-optical disk 18 via a quarter-wave retardation plate 130 provided on the optical structure 118, and via an object lens 132. In the meantime, the linearly polarized light (S-type) reflected from the joining surface 122a is reflected by the mirror surface 128a, and directed through the quarter-wave retardation plate 130 and the object lens 132 to the memory location on the magneto-optical disk 18 at which the light from the light source 110 is incident. The quarter-wave retardation plate 130 is disposed such that its optic axis is inclined 45 degrees to the direction of wave vibrations of the P-type polarized light from the polarizing beam splitter portion 120, in a plane perpendicular to the axis of propagation of the incident light. The quarter-wave retardation plate 130 acts as an element which converts the P-type polarized light into circularly polarized light, while it converts the S-type polarized light into circularly polarized light having the optical rotation opposite to that of the S-type polarized light. As previously indicated, there are two forms of circularly polarized light in terms of direction of optical rotation of the electric vector as viewed in the direction of propagation: the rotation being to the right or to the left. In the quarter-wave retardation plate 130, the circularly polarized light with right or left rotation as viewed in one predetermined direction along the light path is converted into the P-type or S-type polarized light, respectively, and conversely the P-type or S-type polarized light is converted into the circularly polarized light with right or left rotation. The object lens 132 is used to converge the above indicated two kinds of circularly polarized light beams at a single spot (memory location) on the magneto optical disk 18, at right angles to the surface of the disk 18. This disk 18 has the same structure as that illustrated in FIG. 3, but may be replaced by the disk 18 shown in FIG. 6.

Like the incident light, the light reflected from the magneto-optical disk 18 is present in the form of two circularly polarized light beams rotating respectively in the right and left directions as viewed in the direction of propagation. However, the directions of rotation of these reflected circularly polarized light beams are reversed when viewed in the direction from the quarter-wave retardation plate 130 toward the disk 18. Accordingly, when the reflected circularly polarized light beams from the disk 18 are converted into linearly polarized light beams by the quarter-wave retardation plate 130, the P-type polarized light incident upon the disk 18 is converted into the S-type polarized light, while the S-type polarized light incident upon the disk 18 is converted into the P-type polarized light. As a result, the light originating from the light source 110 and reflected from the magneto-optical disk 18 (reflected circularly polarized light) is converted into the S-type polarized light by the quarter-wave retardation plate 130, then transmitted through the dichroic mirror portion 128, and reflected by the joining surface 120a of the polarizing beam splitter portion 120. The light reflected from the joining surface 120a is received by first data-reading optical detector in the form of a photodiode 142 for detecting the total quantity of the light reflected from the magneto-optical disk 18. Similarly, the light originating from the light source 112 and reflected from the magneto-optical disk 18 (reflected circularly polarized light) is converted into the P-type polarized light by the quarter-wave retardation plate 130, then reflected by the dichroic mirror portion 128, and transmitted through the joining surface 122a of the polarizing beam splitter portion 120. The light reflected from the joining surface 122a is received by second data-reading optical detector in the form of a photodiode 144 for detecting the total quantity of the light reflected from the disk 18. The photodiodes 123, 126, 142 and 144 sense the quantity (intensity) of the incident light, and produce electric signals corresponding to the detected quantities of the incident light.

A differential amplifier 146 receives the output signal of the photodiode 124 which corresponds to the output of the light source 110, and the output signal of the photodiode 142 which represents the total quantity of the light reflected from the magneto-optical disk 18 based on the light originating from the light source 110. On the other hand, a differential amplifier 148 receives the output signal of the photodiode 126 which corresponds to the output of the light source 112, and the output signal of the photodiode 144 which corresponds to the total quantity of the light reflected from the disk 18 based on the light originating from the light source 112. The differential amplifier 146 produces an output signal which is a difference between the output signals of the photodiodes 124 and 142. That is, the output signal of the differential amplifier 146 corresponds to the output signal of the photodiode 142 less the variation in output quantity of the light source 110. Similarly, the differential amplifier 148 produces an output signal which corresponds to the output signal of the photodiode 144 less the output variation of the light source 112. The output signals of these differential amplifiers 146 and 148 are applied to another differential amplifier 150.

In the instant embodiment of FIGS. 14 and 15, the quantities of the reflected light beams from the magneto-optical disk 18, which are changed according to the magnetizing directions of the magneto-optical layer 22, are detected by the photodiodes 142 and 144. When the magnetizing direction of the layer 22 is changed from one memory location to another, the total quantity of the reflected light received by the photodiode 142 is changed in the direction opposite to that in which the total quantity of the reflected light received by the photodiode 144 is changed. For example, the quantity of the light received by the photodiode 142 is increased upon changing of the magnetizing direction, then, the quantity of the light received by the photodiode 144 is decreased. Therefore, the output signal produced by the differential amplifier 150 is changed by a comparatively large amount when the magnetizing direction is reversed. Accordingly, the S/N ratio of the output signal of the amplifier 150 is improved, and the information stored on the magneto-optical layer 22 can be read out or reproduced accurately with an extremely low rate of reading error.

Now, the following description refers to a manner in which the quantities of the reflected light received by the photodiodes 142 and 144 are changed in opposite directions when the magnetizing direction of the magneto-optical layer 22 is changed from one of opposite directions to the other.

It is generally known that where the direction of propagation of electromagnetic waves is in parallel to the direction of magnetization of the magneto-optical layer 22, the so-called Faraday arrangement is established, wherein natural modes of light are two kinds of circularly polarized light E+, and E−, positive and negative (having right and left optical rotations of the electric vector, respectively). The refractive index (complex) $n_{\pm}'$ of the magneto-optical layer 22 with respect to these circularly polarized lights E+ and E− is expressed by the previously indicated formula (1). The amplitude reflectance $r^{\pm}$ of the light reflected from the magneto-optical layer 22 is expressed by the previously indicated formula (2).

In the formula (2), $\delta^{\pm}$ is a phase term associated with multiple reflection, and obtained from the following formula:

$$\delta\pm = 4\pi n_{\pm}' d/\lambda$$

where,
d: thickness of magneto-optical layer 22
$\lambda$: wavelength of light from light source Further, the values $r_{12}^{\pm}$ and $r_{23}^{\pm}$ in the formula (2) are referred to as Fresnel's reflection coefficient, and expressed by the following formulas:

$$r_{12}^{\pm} = (n_1 - n_{\pm}')/(n_1 + n_{\pm}')$$

$$r_{23}^{\pm} = (n_{\pm}' - n_3)/(n_{\pm}' + n_3)$$

Thus, it is apparent from the formula (2) that the amplitude reflectance $r^{\pm}$ when the refractive index is $n'+$ is different from that when the refractive index is n-, and that the total quantity of reflected light from the magneto-optical layer 22 when the circularly polarized light with right optical rotation is incident upon the magneto-optical layer 22 at right angles to its surface, is different from that when the circularly polarized light with left optical rotation is incident in the same manner. In other words, while the magneto-optical layer 22 is kept exposed to the circularly polarized light with the same rotating direction (right or left), the total quantity of the reflected light from the layer 22 is altered between two distinct values corresponding to the opposite directions in which the memory locations of the magneto-optical layer 22 is magnetized normally or perpendicularly to its surface. This changing total quantity of the reflected light from the magneto-optical layer 22 is utilized to read out or reproduce signals (information) which have been written on the layer 22 through local magnetization of its multiplicity of memory locations.

As previously described, the two kinds of circularly polarized light beams originating from the light sources 110 and 112 are incident upon the same memory location of the magneto-optical layer 22. According to the formula (2), the total quantities of these two light beams reflected from the layer 22 are changed in the opposite directions when the light beams are incident upon another memory location at which the magneto-optical layer 22 is magnetized in the reverse direction. In other words, the output signals of the photodiodes 142 and 144 which are applied to the differential amplifiers 146 and 148 for reduction of noises due to output variations of the light sources 110 and 112, are changed in the opposite directions each time the magnetizing direction of the magneto-optical layer 22 is changed from one direction to the other. Thus, the output signal of the differential amplifier 150 is altered by a greater amount upon change in the magnetizing direction, than in the preceding embodiments wherein a single light source is provided. Thus, the output signal of the differential amplifier 150 has a higher S/N ratio.

In the instant embodiment wherein two kinds of light beams with different wave lengths reflected from the same memory location of the magneto-optical layer 22 are detected by the photodiodes 142 and 144, the quantities of the reflected light beams are changed in the opposite directions when the magnetizing direction of another memory location is reversed. Hence, a relatively large difference is obtained between the output signals of the photodiodes 142 and 144, and thus the information written on the magneto optical layer 22 through magnetization in the opposite directions can be recognized with increased accuracy by means of the output signals of the differential amplifier 150 with an improved S/N ratio.

Further, the output signals of the light source monitoring photodiodes 124 and 126 which represent the output variations of the light sources 110 and 112 are applied to the differential amplifiers 146 and 148, so that the output variations of these light sources 110, 112 are eliminated from the output signals of the photodiodes 142 and 144 (first and second data-reading optical detectors). With this arrangement, the output signals of the differential amplifiers 146 and 148 are free from noises arising from a drift of a power source to power the light sources 110 and 112, or arising from a variation in output characteristics of the light sources 110 and 112. Hence, the S/N ratio of the output signal of the differential amplifier 150 is further increased. Thus, the differential amplifiers 146 and 148 serve as monitoring means for eliminating noises caused by the output variations of the light sources 110, 112.

Like the preceding embodiments, the instant embodiment uses no costly analyzer as used in the known device for detecting an angle of rotation of the plane of vibrations of the linearly polarized light, which plane is slightly rotated upon reflection from or transmission through a magneto-optical disk. In the instant embodiment, too, the information reading, retrieval or reproduction is effected by means of the photodiodes 142, 144 which detect a change in the quantity of the light beams reflected from the magneto-optical layer 22, which total quantities are changed between two values corresponding to the opposite directions in which the layer 22 is magnetized for data storage.

Figure 16:
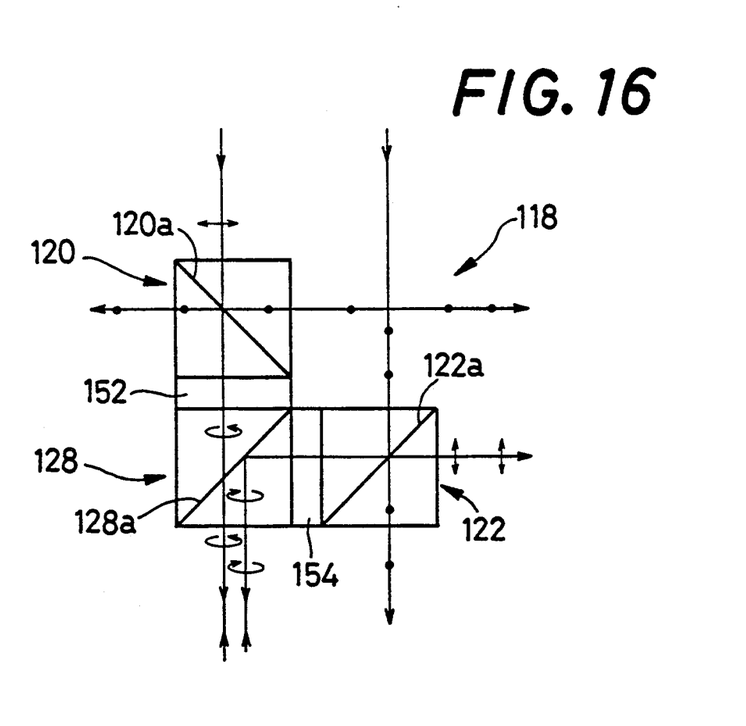
FIG. 16 is a schematic view showing a part of a still further embodiment of the invention, corresponding to FIG. 15.

A modified embodiment of the invention, alternative to the embodiment of FIGS. 14 and 15, is illustrated in FIG. 16, wherein two quarter-wave retardation plates 152 and 154 are provided, in place of the quarter-wave retardation plate 130 provided on the optical structure 118 of the embodiment of FIG. 14. The quarter-wave retardation plate 152 is disposed between the beam splitter portion 120 and the dichroic mirror portion 128, and the other quarter-wave retardation plate 154 is disposed between the polarizing beam splitter portion 122 and the dichroic mirror portion 128. This embodiment provides the same advantages as offered by the preceding embodiment of FIG. 14. In addition, the instant embodiment is advantageous over the preceding embodiment wherein the quarter-wave retardation plate 130 should be manufactured so that the optical path difference of one-quarter wavelength is established with respect to both the wavelength of the light source 110 and the wavelength of the light source 112. Since the quarter-wave retardation plates 152 and 154 are provided for the respective light sources 110 and 112, the manufacture of each plate 152, 154 requires the optical path difference with respect to the wavelength of only the respective one of the light sources 110, 112. That is, the plates 152 and 154 are easier to manufacture.

In the embodiment of FIG. 14, the laser light source 110 and the polarizer 114, and the laser light source 112 and the polarizer 116, constitute two light source devices for producing linearly polarized light beams of different wavelengths. In such an arrangement, the laser light source 110, 112 may be replaced by a source of other monochromic light. Further, the polarizers 114, 116 are not necessary in the case where the light source 110, 112 is a laser of external resonance type, semiconductor laser or other types of light source which produce linearly polarized light.

As previously described, the embodiment of FIG. 14 uses the photodiodes 124, 126 and the differential amplifiers 146, 148 for the purpose of monitoring the output variations of the light sources 110, 112. However, the principle of the invention may be practiced with an intended result even where the outputs of the photodiodes 142 and 144 are directly applied to the differential amplifier 150.

Further, the differential amplifiers 146, 148 may be replaced by laser output monitoring circuits as illustrated at 56 in FIG. 9. In this instance, the monitoring circuits constitute monitoring means which control the respective light sources 110, 112 based on the output signals of the monitoring detector photodiodes 124, 126, so that the outputs of the light sources 110, 112 are kept constant.

While the present invention has been described in its preferred embodiments, it is to be understood that the invention is not limited thereto; but changes and modifications may occur to those skilled in the art in the light of the above teachings.

For example, in the embodiments of FIGS. 1, 5, 7–9 and 11–14, suitable lenses, mirrors and other optical elements may be disposed as needed, between the polarizing beam splitter 14 or optical structure 118, and the light source 10, 50, 110, 112, photodiode 20, 54, 124, 126, 142, 144, or magneto-optical disk 18.

Further, the quarter-wave retardation plate 16, 130, 152, 154 may be replaced by Fresnel's rhombic body or other one-quarter wave elements which give an optical path difference of ¼ wavelength.

While the preceding embodiments have been described in connection with the magneto-optical disk 18 which has a planar circular configuration, a magneto-optical data storage medium used according to the invention may take other forms such as drums and tapes.

As another modification, it is possible that the photodiodes 20, 54, 124, 126, 142, 144 used in the illustrated embodiments can be replaced by other suitable optical detectors such as photo-cells and photomultiplier tubes.

It will be obvious that other changes, modifications and improvements may be made without departing from the spirit of the invention.

What is claimed is:

1. An apparatus for reading out information from individual memory locations on a magneto-optical storage medium at which the information is written through magnetization of the storage medium in one of opposite directions normal to a surface of the storage medium, comprising:
- a light source device for producing two beams of circularly polarized light having different wavelengths and different rotating directions, said two beams of circularly polarized light being concurrently incident upon the same memory location of said storage medium, and reflected from said storage medium;
- a dichroic mirror for separating said two beams reflected from said storage medium, by a difference in wavelength between the two beams; and
- a pair of data-reading optical detectors for detecting quantities of said two beams reflected from said storage medium, respectively, and generating output signals corresponding to the detected quantities to read said information from said storage medium.

2. An apparatus for reading out information from individual memory locations on a magneto-optical storage medium at which the information is written through magnetization of the storage medium in one of opposite directions normal to a surface of the storage disk, comprising:
- a pair of light source devices for radiating two beams of linearly polarized light in directions parallel to each other, said two beams of light having different wavelengths;
- a pair of polarizing beam splitters disposed such that said two beams of linearly polarized light are incident upon said pair of polarizing beam splitters, respectively, said polarizing beam splitters having respective joining surfaces perpendicular to each other;
- a dichroic mirror having a mirror surface which is perpendicular to one of said joining surfaces of the polarizing beam splitter and parallel to the other of said joining surfaces, said dichroic mirror detecting said two beams of linearly polarized light from said joining surfaces toward said data storage disk in the same direction, splitting the light reflected from said storage disk into separated two beams of light, and returning the separated two beams of light toward said joining surfaces of the polarizing beam splitters;
- a quarter-wave retardation plate interposed in a light path between said pair of polarizing beam splitters and said storage disk, and converting said two beams of linearly polarized light from said polarizing beam splitters into corresponding two beams of circularly polarized light having optical rotating directions opposite to each other, said quarter-wave retardation plate converting said light reflected from said storage disk into linearly polarized light;
- first and second data-reading optical detector means for detecting quantities of the two beams of light which are returned to said joining surfaces by said dichroic mirror and reflected from said joining surfaces, said first and second data-reading optical detector means generating a first and a second output signal corresponding to the detected quantities of said two beams of light reflected from said joining surfaces, respectively; and
- data-reading means responsive to said first and second output signals from said first and second data-reading optical detector means, and generating, based on a difference between said first and second output signals, an output signal representative of the information stored on said storage disk.

3. An apparatus as claimed in claim 2, wherein said pair of polarizing beam splitters, said dichroic mirror and said quarter-wave retardation plate are integrally united to each other to constitute an optical structure.

4. An apparatus as claimed in claim 2, wherein said pair of light source devices are disposed relative to said pair of polarizing beam splitters such that said planes of polarization of two beams of linearly polarized light from said light source devices are slightly inclined with respect to planes of polarization of P-type and S-type polarized light beams of said pair of polarizing beam splitters, respectively, said apparatus further comprising:
- first and second monitoring optical detector means for detecting quantities of components of said two beams of linearly polarized light which are emitted from said light source devices and reflected from or transmitted through said pair of polarizing beam splitters, respectively, said first and second monitoring optical detector means generating a third and a fourth output signal corresponding to the detected quantities of said components of the two beams of linearly polarized light, respectively,
- said data-reading means generating an output signal based on a difference between a difference between said first and third output signals, and a difference between said second and fourth output signals.

5. An apparatus as claimed in claim 2, wherein said magneto-optical data storage disk comprises a laminate including a metallic reflector substrate, a dielectric layer adhering to said metallic reflector substrate, a magneto-optical layer adhering to said dielectric layer, and an anti-reflection dielectric layer adhering to said magneto-optical layer.

* * * * *